Aug. 20, 1935.     J. C. MILLER     2,011,723
COLLAPSIBLE TOP
Filed July 10, 1933     3 Sheets-Sheet 1
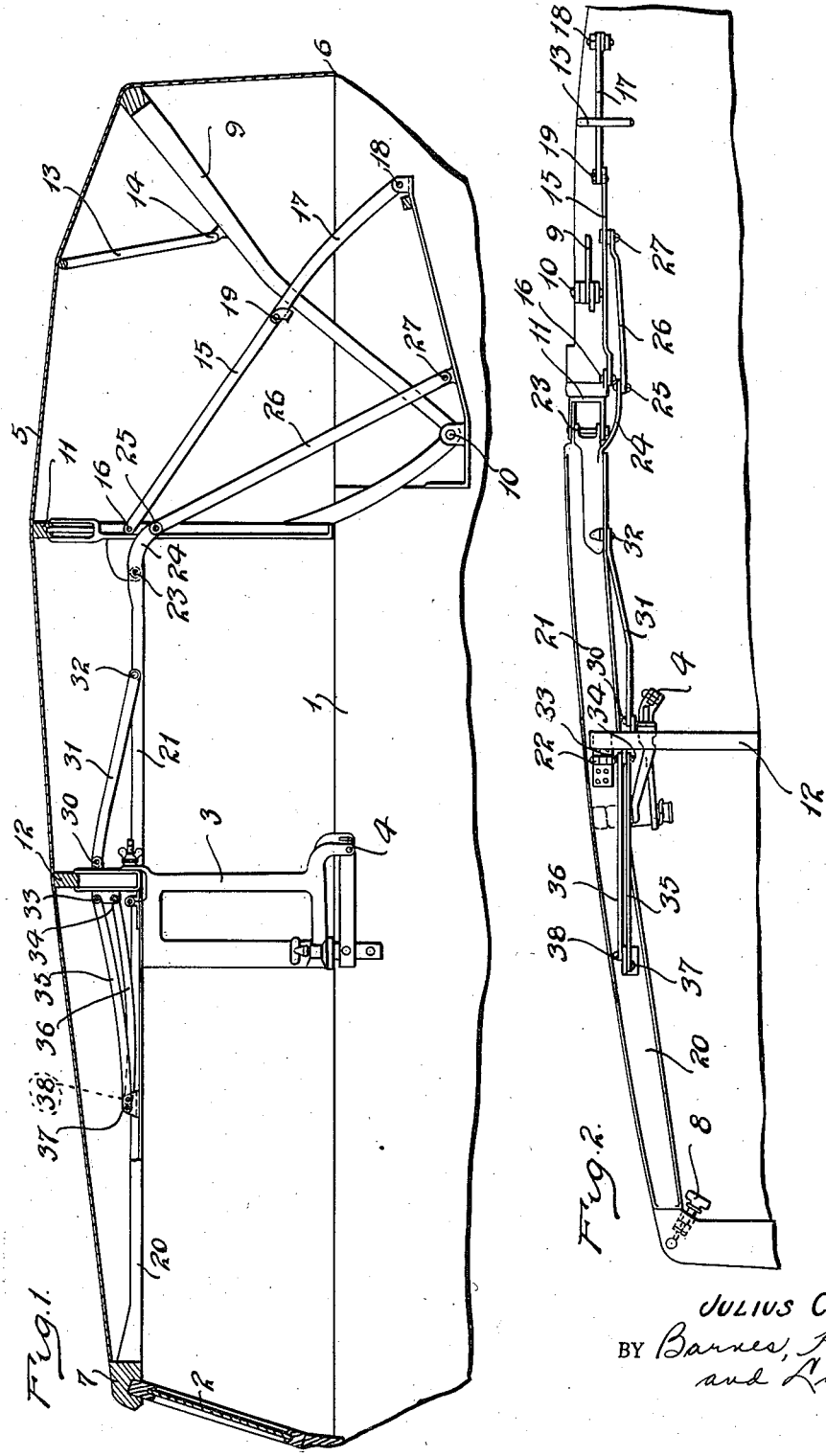
INVENTOR.
JULIUS C MILLER.
BY Barnes, Kisselle
and Laughlin.
ATTORNEYS.

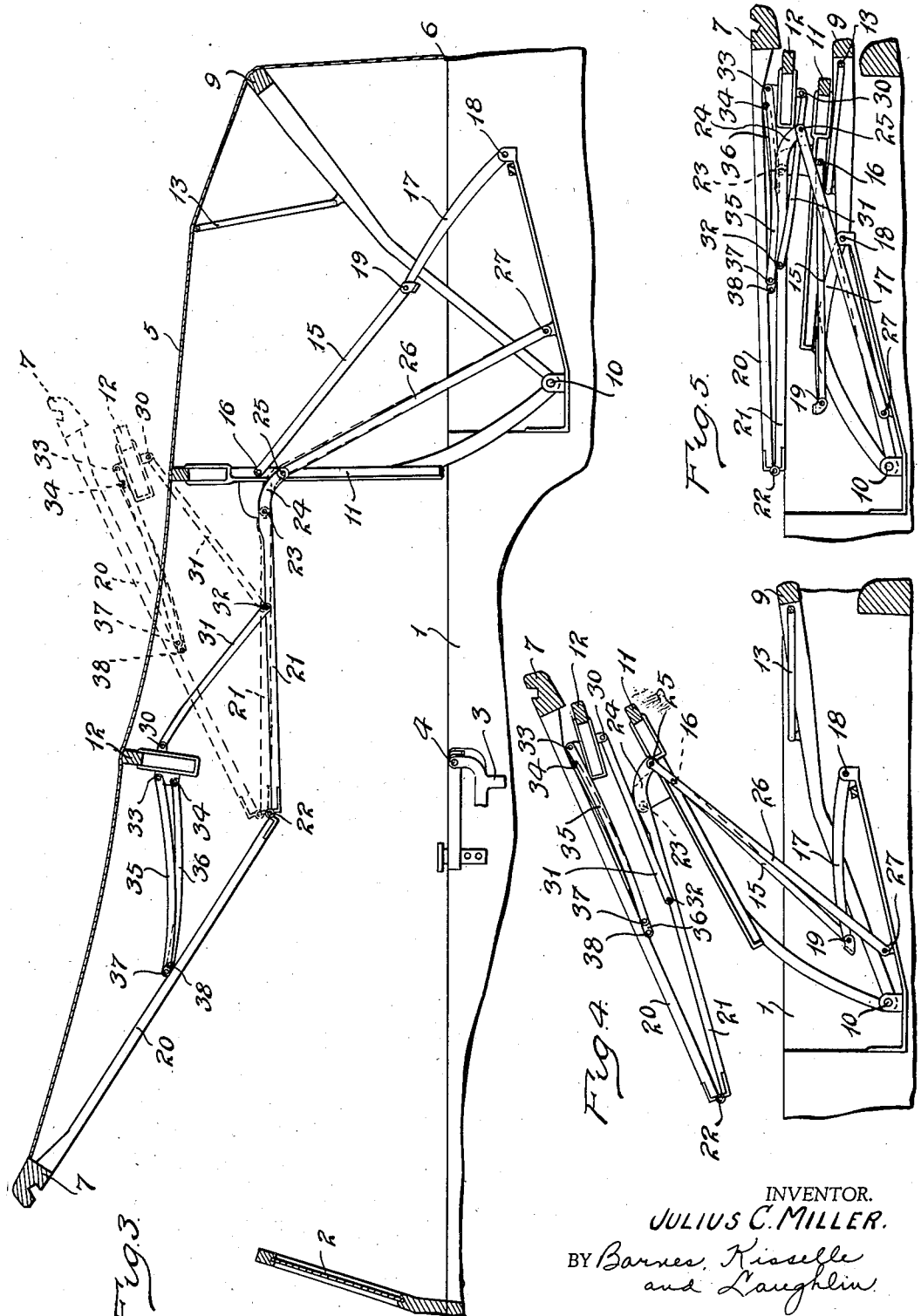

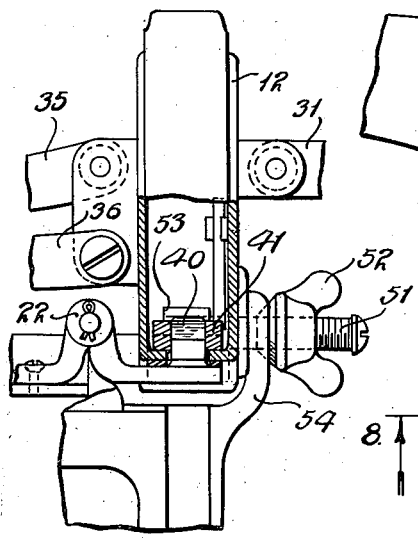
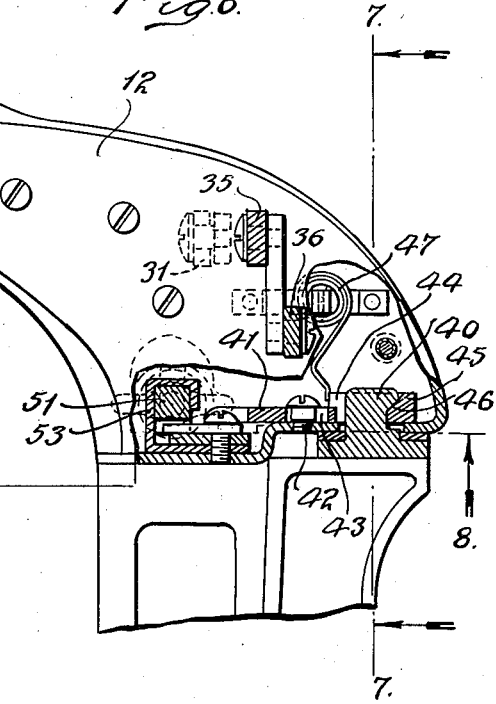
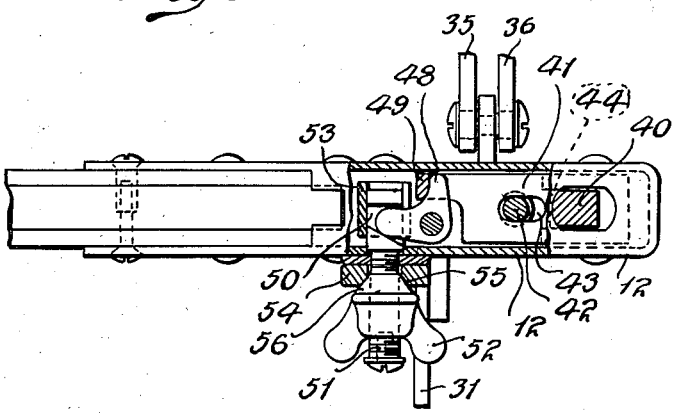

Patented Aug. 20, 1935

2,011,723

UNITED STATES PATENT OFFICE 2,011,723

COLLAPSIBLE TOP

Julius C. Miller, Detroit, Mich., assignor to General Motors Corporation, Detroit, Mich., a corporation of Delaware Application July 10, 1933, Serial No. 679,732

4 Claims. (Cl. 296—121)

This invention relates to an all weather top for an automotive vehicle.

It is an object of this invention to produce a collapsible top for an automotive vehicle which can be raised and lowered by a single individual.

This invention also contemplates a collapsible top wherein the raised and collapsed positions of the front bow are controlled by the making and breaking of the cant rail.

This invention further contemplates a novel locking arrangement for securing the front bow to the cant rail.

Fig. 1 is a vertical longitudinal section through the all weather top in raised position.

Fig. 2 is a fragmentary top plan view of the same.

Fig. 3 is a longitudinal section through the top showing one of the demountable pillars in removed position and one of the cant rails partially broken.

Fig. 4 shows the top with a cant rail completely broken and the rear bow portion partially collapsed.

Fig. 5 shows the top completely collapsed.

Fig. 6 is a fragmentary view partly in section showing the lock for securing the front bow to the cant rail.

Fig. 7 is a section along the line 7—7 of Fig. 6.

Fig. 8 is a section along the line 8—8 of Fig. 6.

Referring to the drawings there is shown a vehicle body 1 having a windshield 2. The body 1 is provided with a pair of demountable pillars 3 extending from the belt to the cant rail and pivoted as at 4. The pillar 3, when it is desired to collapse the top, can be swung rearwardly and downwardly into the body so that it fits snugly along the back of the front seat.

The top canopy 5 may be of any suitable flexible material such as fabric or leather, and is secured along its rear edge as at 6 to the body and along its front edge to the windshield header 7. The header may be detachably secured to the windshield in any suitable manner such as by the thumb screws 8. The canopy 5 is supported by, and secured to, the rear bow 9 which is pivoted to the body as at 10, by the center bow 11 which is likewise pivoted to the body as at 10, the front bow 12 and the auxiliary rear bow 13 pivoted to the rear bow 9 as at 14.

The rear bow 11, when in raised position, is supported by a brace of the snap over center type comprising the link 15 pivoted to the bow 11 as at 16, and the link 17 pivoted to the body as at 18 and to the link 15 as at 19. The center bow 11 supports the breakable cant rail which is comprised of the front part 20 and the rear part 21. The front part 20 of the cant rail is fixed to the header 7 at its forward end and is hinged to the rear part 21 as at 22. The rear part 21 is pivoted to the center bow 11 as at 23. The hinge 22 is such, as shown in the drawings, that the cant rail breaks downwardly or in other words, the front part 20 hinges upwardly and backwardly upon the rear part 21. The rear part 21 of the cant rail has an offset portion 24 which projects beyond the pivot 23 (Figs. 2 and 3). The projecting end 24 of the part 21 is pivotally connected as at 25 to the link 26 which is pivotally connected to the body at its lower end as at 27.

Since this top is of the collapsible type, it is desirable that it occupy a minimum amount of space when in collapsed position. Therefore it is desirable that the front bow 12, which is in the upright or vertical position as shown in Fig. 1 when the top is raised, should be tipped over on its side or to the approximately horizontal position as shown in Fig. 5 when the top is collapsed and nested away. To this end the bow 12 is provided with means for automatically swinging it from vertical or upright position, shown in Fig. 1, to the down or horizontal position shown in Fig. 5, as the top is lowered or vice versa when the top is raised. Hence, the front bow 12 has pivoted to its rear face as at 30 the link 31 which in turn is pivoted to the rear part 21 of the cant rail as at 32. The front bow has pivoted to its front face as at 33 and 34, the links 35 and 36 respectively. The links 35 and 36 in turn are pivoted to the front part 20 of the cant rail as at 37 and 38 respectively. It will be noted that the pivot 33 of the link 35 is positioned above the pivot 34 of the link 36 and that the pivot 37 of the link 35 is positioned in front of the pivot 38 of the link 36 when the top is in raised position. Hence, this arrangement is such that when the part 20 of the cant rail is swung rearwardly upon the part 21, the links 35 and 36 automatically tilt the bow 12 from the upright position, shown in Fig. 1, to the approximately horizontal position, shown in Fig. 5.

It is desirable when the top is in raised position to lock the front bow 12 to the cant rail. To this end the hinge 22 has fixed on its upper face the keeper 40. The bow 12 has slidably mounted therein the bolt 41 which is retained in place by the screw 42 which engages the bolt in the slot 43. The bolt 41 is provided with an opening 44 having a beveled face 45 which engages the beveled face 46 of the keeper 40 to lock the bow 12 to the cant rail. The bolt 41 is provided with a suitable bolt spring 47 such as that shown. The opening 44 is somewhat larger than the keeper 40 thus permitting the bolt to be reciprocated to the right and left as viewed in Fig. 6, within the bow 12.

The bolt 41 is projected to the right or released position by the bolt spring 47 and is arranged to be thrown into keeper engaging position by a tumbler in the form of a bell crank 48. One arm of the bell crank 48 engages the upturned end 49 of the bolt 41 which serves as a tumbler abutment. The other arm of the tumbler 48 engages in the groove 50 of the screw 51 which has threaded thereon the wing nut 52. The inner end of the screw 51 is square in cross-section, as shown in Fig. 6, and is guided in the guideway 53. The upper end of the removable pillar 3 is provided with the prong 54 which receives the screw 51. The prong 54 is provided with a concave socket 55 which receives the convex inner end 56 of the wing nut 52.

In operation after the removable pillar 3 has been swung to upright position so that the screw 51 enters the prong 54, (the wing nut 52 having been previously loosened so that the bolt spring 47 has projected the bolt 41 to released position) the bow 12 is fitted down upon the cant rail so that the keeper 40 enters the opening 44 in the bolt 41. At this time the wing nut 52 is tightened thus causing the screw 51 to move outwardly which in turn swings the bell crank tumbler 48 in a counter-clockwise direction as viewed in Fig. 8. As the bell crank 48 moves in counter-clockwise direction it draws the bolt 41 to the left or latching position whereupon the beveled face 45 of the bolt engages the beveled face 46 of the keeper 41 thus drawing the bow 12 tightly down upon the cant rail and locking the same securely together. If desired, the roof can be used in raised position with the pillars 3 in lowered position and in such case the front bow 12 is latched to the collapsible cant rails the same as described above by turning the wing nuts 52 down on the screws 51. The latching of the bow 12 to the cant rails prevents the cant rails from collapsing.

To disassemble the pillar 3, cant rail and bow 12 the wing nut 52 is turned to released position thus permitting the screw 51 to move inwardly which in turn permits the tumbler 48 to swing in a clockwise direction and the bolt is thrown to the right or released position by the bolt spring 47 thus releasing the bolt from the keeper 40 and permitting the bow 12 to be disconnected from the cant rail 22.

After the locking engagement between the pillar 3, cant rail, and the front bow 12 has been released and the header 7 disengaged from the windshield 2, the front part 20 of the cant rail can be swung about the hinge 22 backwardly or in a clockwise direction upon the rear part 21. It is, of course, understood that the bows extend from one side of the body to the other and that they are provided on each side with the braces, linkage, and cant rails, such as shown in the drawings. It will be noted, referring particularly to Fig. 3, that as the front part 20 of the cant rail is being hinged backwardly that the cant rail does not fall down and strike the body. The cant rail can not break downwardly completely and strike the body because the projecting ends 24 of the rear parts 21 of the cant rails are connected to the links 26 which control the making and breaking of the cant rails. In other words, this is a true one-man top which can be raised and lowered by a single individual and in which the breaking of the cant rail is controlled by the links 26 and in turn the breaking of the cant rails controls the collapsing center and rear bows. As the part 21 of the cant rail swings counter-clockwise about the pivot 23, the pivot 25 between the projecting end 24 of the part 21 and the link 26 moves upwardly thus causing the center bow 11 to pivot clockwise or rearwardly about the pivot 10. Of course, it is understood that the brace 15 is first broken downwardly as shown in Fig. 3.

As the part 20 of the cant rail is hinged rearwardly upon the part 21, the pivot 33 which is initially in vertical alignment with and above the pivot 34 moves to the rear of the pivot 34, as shown in the dotted lines Figs. 3, 4 and 5, necessarily because the pivot 37 which is initially in front of the pivot 38 moves to the rear of the pivot 38. Hence, as the cant rail is collapsed and swung rearwardly along with the center bow 11 and rear bow 9 to completely collapsed position, shown in Fig. 5, the front bow 12 is automatically moved from the upright position shown in Fig. 1 to the approximately horizontal position shown in Fig. 5, thus permitting the collapsed top to occupy a very much smaller space when collapsed than it would if the bow 12 remained upright.

In raising the top from the nested position, shown in Fig. 5, as the hinged parts 20 and 21 of the cant rail are swung about the hinge 22 to make the cant rail, the links 31, 35 and 36 automatically swing the front bow 12 from the horizontal to the upright position and at the same time the link 26, coacting with the projecting end 24 of the part 21 of the cant rail, swings the center bow 11 to upright position. At the same time the canopy 5 raises the rear bow 9 to the raised position, shown in Fig. 7. The center bow 11 can be further supported by snapping the brace 15, 17 over center.

I claim:

1. In a collapsible top for a vehicle body having a removable bow and a cant rail for supporting the bow, a keeper fixed to one of the said members, and a reciprocable bolt mounted on the other of said members, the said bolt and keeper having interengaging cam surfaces, and means for drawing the bolt into interengaged relation with the said keeper whereby the bow is latched tightly into rattle-proof engagement with the cant rail.

2. In a collapsible top for a vehicle body having a removable bow and a cant rail for supporting the bow, a keeper fixed to one of the said members, and a reciprocable bolt mounted on the other of said members, the said bolt and keeper having interengaging cam surfaces, and means for drawing the bolt into interengaged relation with the said keeper whereby the bow is latched tightly into rattle-proof engagement with the cant rail, and a spring for throwing the bolt into released position when the bolt retracting means are released.

3. In a collapsible top for a vehicle body having a removable bow and a cant rail for supporting the same, a keeper carried by one of said members, a reciprocable bolt slidably mounted on the other of said members, the said bolt and keeper having interengaging cam surfaces, a bell crank tumbler having one arm in operative engagement with the bolt for retracting the same, a slidable screw operatively engaged to the other arm of the bell crank, and a nut threaded on the said screw whereby when the nut is turned down the movement of the screw is translated through the bell crank tumbler to the bolt to latch the bow and cant rail tightly together.

4. In a collapsible top for a vehicle body having a removable bow and a cant rail for supporting the same, a keeper carried by one of said members, a reciprocable bolt slidably mounted on the other of said members, the said bolt and keeper having interengaging cam surfaces, a bell crank tumbler having one arm in operative engagement with the bolt for retracting the same, a slidable screw operatively engaged to the other arm of the bell crank, a conical nut threaded on the said screw, and a removable pillar for supporting the said bow and cant rail having a bifurcated bracket with a conical socket arranged to receive the slidable screw whereby when the nut is turned down the movement of the screw is translated through the bell crank tumbler to the bolt to latch the bow and cant rail together and the conical nut engages the conical socket in the removable pillar bracket to latch the pillar to the cant rail and bow.

JULIUS C. MILLER.